W. ALTICK.
Rotary Cultivator.
No. 64,057. Patented Apr. 23, 1867.
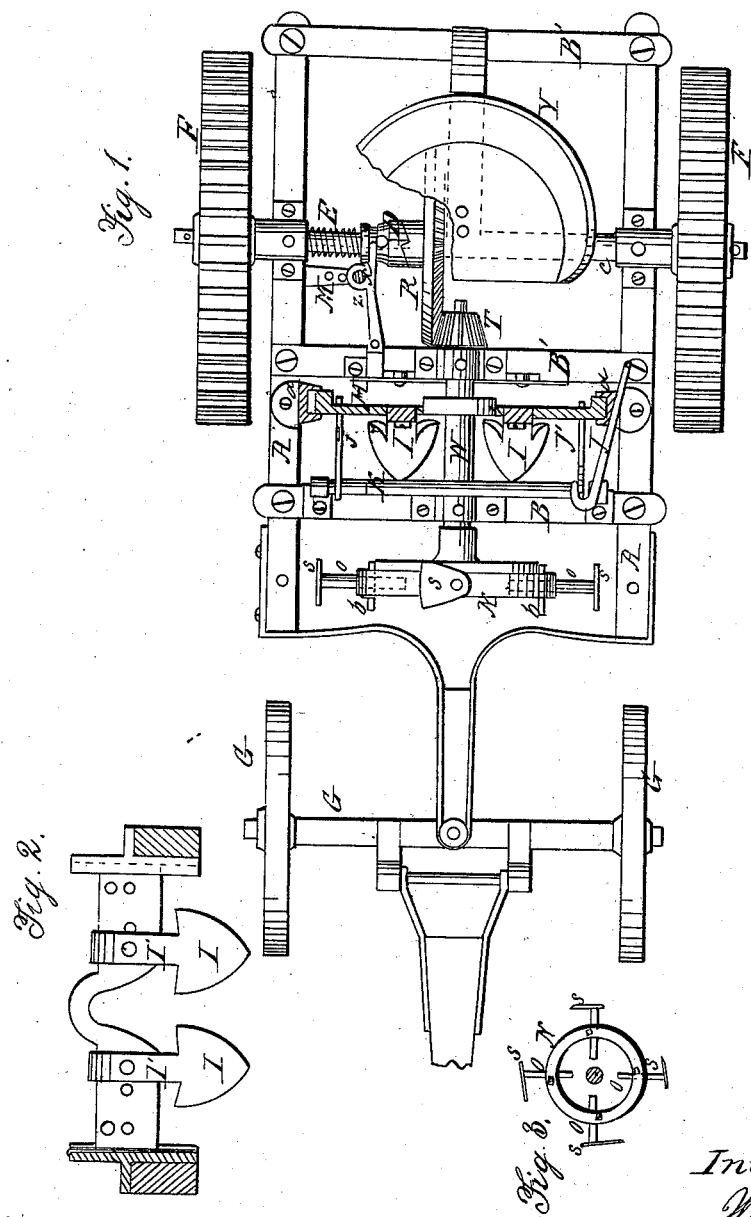

UNITED STATES PATENT OFFICE.

WILLIAM ALTICK, OF DAYTON, OHIO.

*Letters Patent No. 64,057, dated April 23, 1867.*

IMPROVEMENT IN MACHINE FOR CULTIVATING COTTON.

*The Schedule referred to in these Letters Patent and making part of the same.*

TO ALL WHOM IT MAY CONCERN:

Be it known that I, WILLIAM ALTICK, of Dayton, in the county of Montgomery, and in the State of Ohio, have invented new and useful Improvement in Machine for Cutting and Thinning out Cotton Plants, &c.; and do hereby declare that the following is a full, clear, and exact description thereof, reference being had to the accompanying drawings, and to the letters of reference marked thereon.

In the annexed drawings, making part of this specification, A A represent the side pieces, and B' B'' the cross-pieces composing the frame of the machine. G G represent the forward wheels, which are provided with an axle, G', which said axle supports the forward end of the frame. C represents the rear axle, which supports the rear end of the frame, and which is provided with the wheels F F. The wheels F are provided with flanges upon their peripheries, to prevent their slipping upon the ground. The axle C is provided with a clutch, D, which said clutch is operated in one direction by means of a spring, E, and in the other by means of a forked bar, L, which catches into a groove in the periphery of the clutch. The bar L is operated by means of a rod which passes through a hole in it, the lower end of said bar passing into one of a series of holes in a plate, M, which is secured to one of the frame pieces A. The driver or operator, who is stationed upon the seat $y$, takes the rod $x$ (a top view of which is represented,) in his hand and operates the bar L, and with it the clutch D. The clutch D is used for stationing a wheel, R, upon the shaft C when it is desired. The bevel gear-wheel R is placed loose upon the shaft C, but is made stationary upon it, and made to revolve with it when the clutch is allowed to catch it. The bevel-wheel R gears into a bevel-pinion, T, which is secured upon the rear end of a shaft, W. This shaft W lies lengthwise of the frame, and has its bearings upon the frame pieces B B¹. On the forward end of the shaft W is secured a wheel, N. The periphery of this wheel is provided with a series of holes or openings, through or into which pass the arms $o\ o$. The arms $o\ o$ have grooves cut crosswise upon them, so that they may be secure in the wheel, by means of the pins $b\ b$, which said pins pass through the wheel through proper openings at right angles to the arms. Upon the lower or outer ends of the arms $o\ o$ are formed or secured the hoes $s\ s$. When the wheel N revolves the hoes $s\ s$ cut into the rows of plants to be thinned crosswise of it, and thus serve to remove those plants which should not be allowed to grow. The hoes $s\ s$ can, by means of the arms and pins, be adjusted to or from the wheel N, so as to strike deeper or shallower in the ground. H represents a metallic bar which lies crosswise of the frame in rear of the wheel N. The ends of this bar H rest and slide in grooves formed in the metallic plates $a\ a$. These plates $a\ a$ are secured to the frame pieces A A on their insides, as represented. I I represent ploughs or cultivator teeth which are secured upon the lower ends of the beams I' I'. The beams I' are bent over square at their upper ends, so as to hang upon the bar H, and are also provided with holes through which screws or bolts pass to confine them to said bar H. These ploughs or teeth above mentioned are so arranged as to straddle the row of plants, cultivating on each side of said row. K represents a shaft which lies crosswise of the frame, and which is provided with two arms, J' J', which said arms catch into openings in the bar H, made to receive them, and are for the purpose of raising or lowering said bar. J represents a lever which connects to and operates the shaft K. The wheel N may or may not be covered on its upper side with a drum.

In using this machine it is drawn forward in the field of plants, running straddle of the rows. The spring E presses the clutch against the wheel R, and the shaft C imparts motion to said wheel. The wheel R communicates motion to pinion T, shaft W, and wheel N. The hoes upon wheel N cut the plants from the row as the machine advances, not entirely, but leaves them in hills, as they are designed to grow. The wheel N is stopped from revolving and cutting plants by pressing the clutch away from wheel R by means of the bar L and lever $x$. The operator raises and lowers the ploughs or teeth, adjusting them to the ground by means of the lever J. The ploughs can be adjusted laterally by means of holes in the bar H, through which the screws or bolts for holding the beams pass.

Having thus fully described my invention, what I claim as new, and desire to secure by Letters Patent, is—

1. The arrangement of the shaft C, with its clutch and bevel-wheel, with the pinion T, shaft W, and wheel N, provided with its adjustable hoes, the several parts being constructed and used as and for the purpose specified.

2. Adjusting the arms $o\ o$ in the wheel N, by means of their grooves and the pins $b\ b$, substantially as and for the purpose specified.

3. The bar H, upon which the ploughs or cultivator teeth are secured, used in connection with the grooved plates $a\ a$, rock-shaft $k$, with its arms and lever J, substantially as and for the purpose specified.

In testimony that I claim the foregoing I have hereunto set my hand and seal this    day of    1867.

WM. ALTICK.

Witnesses:
   THOS. D. MITCHELL,
   EZRA THOMAS.